[11] 3,610,930

[72] Inventors Dennis C. Lacy
 Garland;
 Curt F. Neukam, Richardson, both of Tex.
[21] Appl. No. 788,183
[22] Filed Dec. 31, 1968
[45] Patented Oct. 5, 1971
[73] Assignee Texas Instruments Incorporated
 Dallas, Tex.

[54] INDEPENDENT INFRARED LANDING MONITOR
 8 Claims, 12 Drawing Figs.
[52] U.S. Cl. .................................. 250/83.3
 HP, 244/77 A, 250/83.3 H, 250/220 R, 350/7,
 350/285
[51] Int. Cl. ....................................... B64c 19/00
[50] Field of Search ................................. 250/83.3 H,
 83.3 HP, 106 VC, 220 MX; 350/6, 7, 285; 244/76,
 83, 77; 340/26, 27

[56] References Cited
 UNITED STATES PATENTS
 2,989,643  6/1961  Scanlon ................ 250/83.3 HP X
 3,423,051  1/1969  Jakab ..................... 356/51 X
 2,944,151  7/1960  Whitney et al. ......... 250/83.3 IR
 3,353,022  11/1967  Schwartz ................. 250/83.3 IR Primary Examiner—James W. Lawrence
Assistant Examiner—Morton J. Frome
Attorneys—Samuel M. Mims, Jr., James O. Dixon, Andrew M. Hassell, Harold Levine, Rene E. Grossman, Melvin Sharp and Richards, Harris and Hubbard ABSTRACT: A method and system for landing an aircraft in substantially all meteorological conditions affecting visibility is disclosed. The method and system are the result of the discovery that infrared radiation in the 8–14 micron range from the runway and related objects penetrate clouds, rain, snow, fog, smog, dust, etc. with sufficiently greater efficiency than the human eye to make safe landings during visibility conditions that would otherwise prevent the landings. The aircraft is navigated to a predetermined position on an approach path to a runway either manually or automatically by onboard radio equipment and radio beacons from the ground. The predetermined point is normally the point at which a missed approach is executed during a standard instrument approach in the event the pilot does not have visual contact with the ground. The approach is then continued to a landing by visually monitoring the infrared image of the runway and the surrounding terrain through a real time system for converting the infrared image to a visible image displayed within the aircraft. The visual display permits safe touchdown either by manual or automatic control in substantially all weather conditions.

PATENTED OCT 5 1971 3,610,930

INVENTORS:
DENNIS C. LACY
KURT F. NEUKAM

René E. Grossman

ATTORNEY

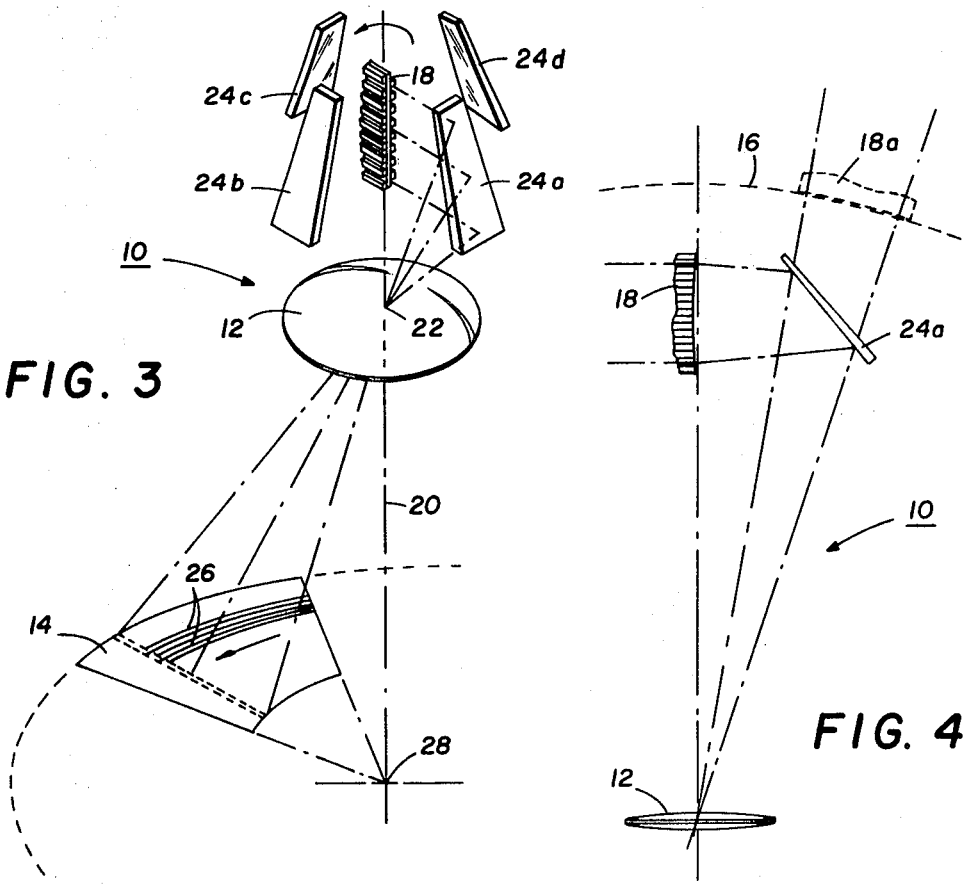
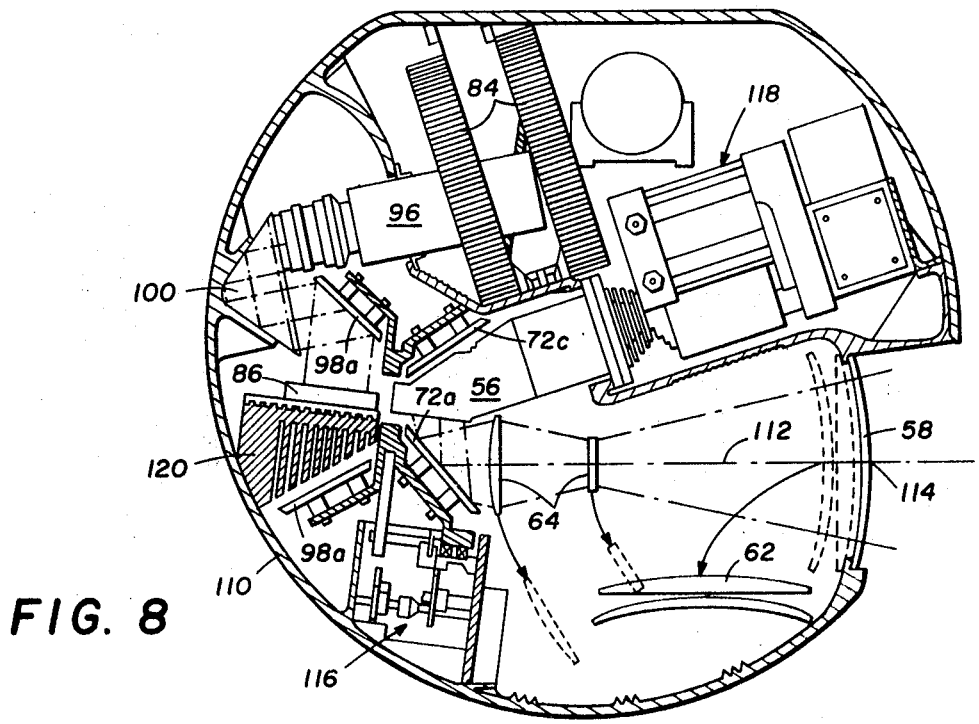

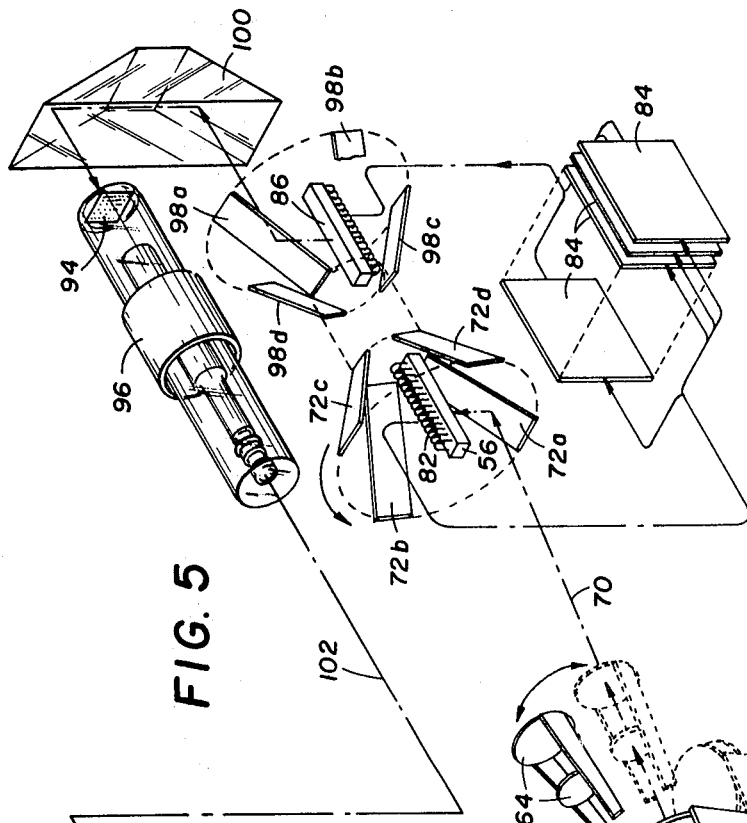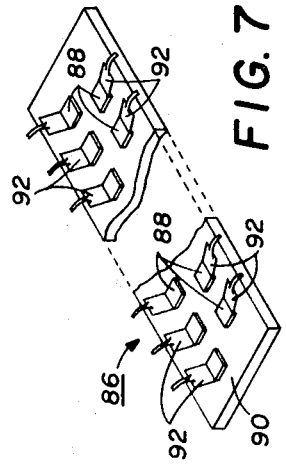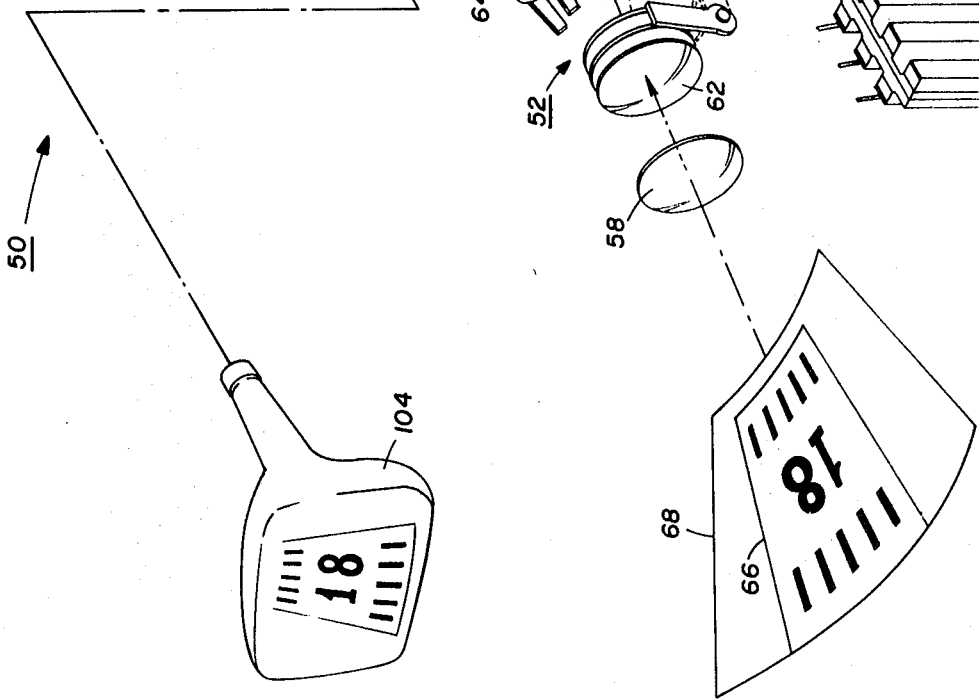

INDEPENDENT INFRARED LANDING MONITOR

This invention relates generally to the navigation of aircraft, and more particularly relates to a method and system for safely landing an aircraft under substantially all weather conditions.

The United States Government has defined minimum weather conditions required before an aircraft can continue an approach to a landing. These weather conditions take into account the capabilities of the aircraft and the pilot, and the equipment installed at the airport. At this time, as much as 95 percent of all commercial operations are restricted to Category I landings which require that the ceiling be at least 200 feet and the runway visual range at least 2600 feet. Only a very small percent of the airports in the United States are certified for Category II landings, which require a minimum ceiling of at least 100 feet and a minimum runway visual range of at least 1200 feet. No Category III, III B or III C landings, which require no minimum ceiling, are permitted by air carriers at this time. Category III requires 700 feet runway visual range to permit a visual landing, Category III B landings require 150 feet runway visual range, which is considered the minimum required for taxiing, and Category III C landings are those with zero-zero visibility, meaning that the pilot cannot see beyond the cockpit. All instrument landings are presently made by navigating the aircraft along a localizer radio beacon for azimuth control and a glide slope radio beacon for elevation control. If the runway has not been visually sighted by the pilot at the middle marker, a vertical radio beacon, the pilot must execute a missed approach procedure rather than continue the approach to a landing. This results in substantial loss of time to repeat the approach procedure, or requires the aircraft to proceed to an alternate airport where the necessary minimum ceiling and visibility conditions exist to permit landing.

Because of the ceiling and visibility requirements for landing, commercial aviation loses large sums of money annually and passengers are greatly inconvenienced. In addition, many accidents have occurred while an aircraft was making an instrument approach due to errors in either the radio beacon or the onboard receiving and display instruments. Aircraft landing short of the runway or to the side of the runway are not uncommon.

As a result of the great need, many landing systems have been developed which automatically fly the aircraft to touchdown by reference to radio beacons, electronic altitude indicators, and other sensor devices. However, all of these landing systems have been rejected by pilots and safety officials primarily because of the difficulty of monitoring the animated presentations of the position and attitude of the aircraft in the critical few seconds prior to touch down, and because of the susceptability of the radio navigation system and monitoring equipment to error with no reliable, independent, secondary means of detecting the error.

It has been known for many years that all objects at a temperature above absolute zero radiate invisible electromagnetic energy having many of the optical characteristics of visible light. This energy is commonly referred to as infrared radiation. Since infrared radiation has the characteristics of light, it has commonly been accepted that meteorological conditions that adversely affect the transmission of light, also adversely affect the transmission of infrared radiation through the atmosphere.

We have discovered that even though infrared energy is attenuated and scattered to some degree by rain, fog, snow, and other conditions which prevent landings at the present time, the infrared energy naturally radiating from a runway, the runway light supports, the soil adjacent the runway, and all other passive objects can be used as a means for effecting a safe landing even in Category III C conditions, particularly when combined with other conventional radio navigation and automatic flight equipment.

In accordance with the method of this invention, the infrared radiation eminating from an entire field of view along a predetermined line of sight from an aircraft is converted to a real time visible image, and the visible image monitored to proceed to a landing. The approach to touch down may be made manually by reference to the visual image, or the visual image used as an independent landing monitor during an approach and touchdown made under the command of an autopilot.

The system of the present invention includes the combination of an aircraft, a radio navigation system for navigating the aircraft to a predetermined point on a glide path to a runway, and a system for converting the infrared image to a visual image. The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

FIG. 3 is a schematic, isometric, optical diagram illustrating an optical scanner used in the infrared system of the present invention;

FIG. 4 is a two-dimensional optical diagram of the scanner of FIG. 3;

FIG. 5 is a schematic, isometric diagram of the system for converting an infrared image to a visible image in real time utilizing the optical scanner of FIG. 3;

FIG. 6 is a simplified isometric view of the infrared detector array used in the system of FIG. 5;

FIG. 7 is a simplified isometric view of the light emitter array used in the system of FIG. 5; and FIG. 8 is a simplified vertical sectional view of the physical layout of the system of FIG. 5.

Figure 1:
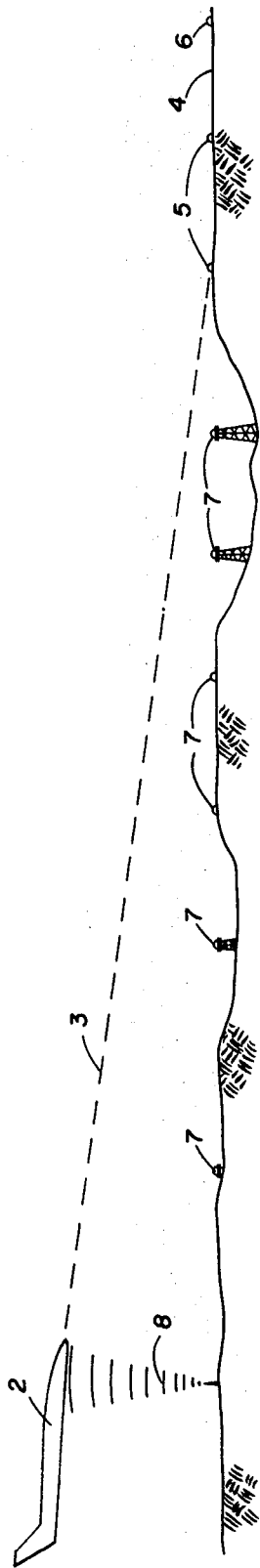
FIG. 1 is a schematic elevational view of the approach to a runway.

Referring not to the drawings, and in particular to FIG. 1, an aircraft 2 is illustrated as making an approach along a glide path 3 to a runway 4 in accordance with the method of the present invention. The aircraft 2 will typically be a commercial carrier equipped with a conventional ILS radio-receiving system. The ILS system provides information defining the position of the aircraft relative to localizer and glide slope beams broadcast from antennae located near the runway 4. The aircraft 2 may be equipped with a conventional flight director computer operated presentation and an automatic pilot for following the ILS defined glide path, and in accordance with one important aspect of the invention, may even be equipped with an automatic landing system. The runway 4 may be any standard runway which will typically include runway threshold lights 5, runway boundary lights 6, high-intensity approach lights 7, and a vertically directed radio beacon 8, commonly referred to as the middle marker, for defining the point on the glide path 3 at which a decision to execute a missed approach procedure of land must be made under existing regulations.

At the present time the aircraft 2 is typically vectored to intersect the localizer beam at a point outside an outer marker (not illustrated) which is another vertical radio beam. The aircraft then proceeds at an altitude so as to intersect the glide slope at the outer marker. It is to be understood, however, that the present invention is not limited to an ILS runway, and in fact, the present invention will permit the present regulations and standard instrument landing systems and procedures to be materially modified. The aircraft then starts to descend along the glide path 3, maintaining the necessary rate of descent and directional control to follow the glide path. If the pilot has not visually acquired the high-intensity approach lights 7 by the time the aircraft reaches point 3 on the glide path defined by the middle marker 8, the pilot would be required to abort the landing attempt and execute a missed approach procedure, except for the present invention.

Figure 2A:
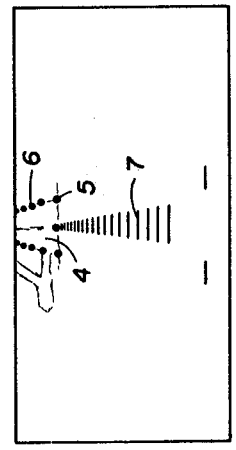
FIGS. 2A–2E are simulations of the visible images derived from the infrared radiations as they might appear to a pilot on approach to a landing in accordance with this invention.
Figure 2B:
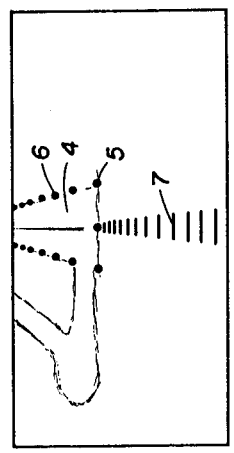
Figure 2C:
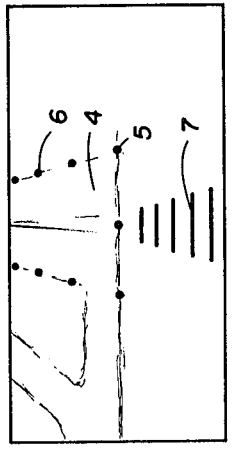
Figure 2D:
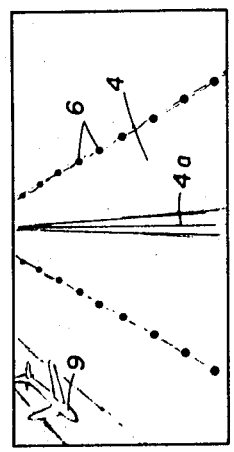

By using the method and system of the present invention, the aircraft 2 may proceed to a safe landing even when zero-zero visibility exists at the runway 4. This is achieved by converting the infrared radiation from the runway 4, the support structure for the lights 5, 6 and 7, and sod adjacent the runway, and all objects on or near the runway, into the visual, real time image. The visual image preferably has an aspect angle selected so that the image appears to the pilot as if he were viewing the runway through a fixed aperture defining the field of view. The image as presented to the pilot might typically appear as illustrated in FIGS. 2A–2E. Under many meteorological conditions such as heavy rain, low clouds, etc., the high-intensity approach lights 7 and support standards will be visible to the pilot at the outer marker, as indicated in FIG. 2A, when they would not be directly visible. This provides the pilot with an independent monitor for checking the operativeness of the ILS equipment on both the ground and in the aircraft.

Figure 2E:
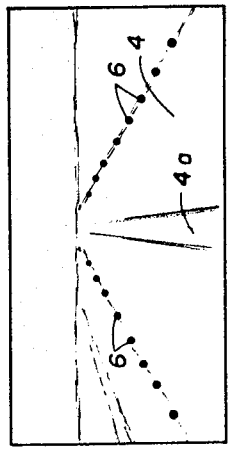

As the aircraft continues the approach, as depicted in FIGS. 2B–2E, the paved runway 4 is readily distinguishable from the surrounding terrain, and many objects, such as the supports for the runway lights 6 and an aircraft 9 on an adjacent taxiway, can be readily ascertained by the time the aircraft reaches the middle marker 8 to directly assist the pilot in determining the position, pitch and yaw of the aircraft. As a result, the pilot can continue his approach to flare out, as illustrated in FIG. 2E, and finally to a touchdown without ever actually acquiring visual contact with the runway, and the aircraft can be taxied to the terminal in Category III C conditions.

During the approach, even the centerline 4a of the runway 4 can usually be seen by the infrared monitor because of the different thermal characteristics of the runway and the material forming the centerline stripe. The effectiveness of the method and system are not materially affected by the presence or absence of the approach lights, threshold lights, or runway lights, since these devices for radiating visible light radiate relatively little infrared energy when compared to that radiated by the paved runway, adjacent sod, and other large bodies.

The optical scanning system of the system for converting the infrared radiation into a real time visual image is indicated generally by the reference numeral 10 in FIGS. 3 and 4. The system 10 includes a suitable lens system, represented by the single lens 12, for focusing infrared radiations eminating from objects in a field of view 14 onto a spherically shaped image plane represented by the dotted line 16 in FIG. 4. A linear array of infrared detectors 18 is disposed along the axis 20 of the optical system 12 between the entrance pupil 22 and the image plane 16, and has a curvature corresponding to the curvature of the image plane 16.

Four mirrors 24a–24d are mounted for rotation about the axis 20 and are disposed between the lens 12 and the image plane 16 at an angle such as to continually focus a radially extending strip of the image onto the line of detectors 18. Rotation of each of the mirrors 24a–24d is the optical equivalent of positioning the detector array 18 at 18a on the image plane 16, as illustrated in FIG. 4, and pivoting the array through a short scanning arc about the axis 20. As a result, each of the respective detectors 18 scans an arc 26 across the field of view 14, and the scanned arcs are concentric about a common point 28 on the axis 20. The width of the scanning arcs, and thus the resolution, is dependent upon the number and size of the detectors.

The detector array 18 has a continuous line of detectors sized to achieve the desired line resolution. In such a case, all of the mirrors 24a–24d are preferably disposed at the same angle with respect to the axis of rotation 20 so that each detector scans the same arcuate path 26 four during each revolution of the mirror assembly, one scan being made each time a mirror passes through the optical path from the field of view.

The same scanning technique may be used to reconstitute the scanned image. This is achieved merely by substituting light sources for the light detectors, driving the light sources with an amplified signal from the respective detectors, and rotating a corresponding set of mirrors in synchronism with the rotating mirrors used to scan the image. Thus, if the detectors are sensitive to invisible electromagnetic radiation, such as infrared radiation, and the light sources of the display system produce visible light, an invisible infrared image can be converted to a visible light image which can be viewed by the human eye.

Referring now to FIG. 5, a system for converting, in real time, an infrared image to a video signal, and then to a visible image at a remote location, is indicated generally by the reference numeral 50. The system 50 utilizes a lens system 52, a rotating mirror assembly 54, and a linear array of detectors 56 which perform the same functions as the lens system 12, the mirrors 24a–24d and the linear detector array 18 of the scanning system 10 described in connection with FIGS. 3 and 4. The lens system 52 includes a stationary lens 58 which functions as a window for the pressurized housing of the system. The stationary lens 58 is used with either a tracking lens assembly 62 or a search lens assembly 64. When the tracking lens assembly 62 is in the active position shown in solid outline, the search lens assembly 64 is in the inactive position shown in solid outline, and the field of view is that represented by area 66. Alternatively, when the tracking lens assembly 62 is pivoted into the inactive position represented in dotted outline, the search lens assembly 64 is pivoted into the active position shown in dotted outline, and the field of view of the system is enlarged to include the area 68. Either the object area 66 or 68 is projected generally along the optical path 70 and reflected onto the array of detectors 56 by the mirrors 72l–72 in the manner heretofore described in connection with the device 10.

The detector array 56 may be of any conventional type. However, in accordance with a specific aspect of the invention, the array 56 is a solid-state array of the type illustrated generally in FIG. 6. The array 56 is comprised of a plurality of mercury-doped germanium bars 74 each of which is mounted at staggered positions on opposite sides of a substrate 76 to provide continuous linear coverage. A pair of electrodes 78 and 80 are in electrical contact with opposite faces of the bar. The electrodes 80 adjacent the substrate 76 are electrically common, and individual lead wires 82 are connected to the electrodes 78. The mercury-doped germanium produces an electric current between the electrodes which is modulated by the electromagnetic energy in the 8–14 micron region that enters the respective bars through the lower ends 74a which are facing the scanning mirrors as they traverse the optical path. The infrared band from 8–14 microns is the band that is least attenuated by meteorological conditions.

The electrical signal produced by each individual detector 74 is amplified by means of a separate channel, represented by the integrated circuit blocks 84, and then applied to drive a corresponding light emitter element of a linear array of light emitters 86. The array of light emitters 86 is preferably comprised of an array of gallium arsenide diodes such as illustrated in FIG. 7. The array 86 has the same number of gallium arsenide diodes 88 arrayed in the same staggered configuration, and on the same scale, as the detectors 74. Each diode is formed by diffusion into a substrate 90, and separate electrical leads are connected to expanded contacts 92 for each of the diodes 88. The other terminals of the diodes are electrically common. The light emitted by the diodes has a wavelength of 0.9 microns.

The light produced by the emitter array 86 is then projected onto the target 94 of a vidicon type camera 96 by means of four mirrors 98a–98d which are mechanically coupled to and rotated with mirrors 72a–72d and a prism 100. The light emitters of the array 86 are disposed in a straight line along the axis of rotation of the mirrors 98a–98d so that the image is reconstituted and focused on the planar target 94 of the camera 96.

The camera 96 is of the general type described in an article entitled "A Charge-Storage Diode Vidicon Camera Tube" published in IEEE Transactions on Electron Devices, Vol. Ed-14, No. 6, June 1967 and operates in the same general manner as a standard vidicon television camera. The silicon diode target is particularly sensitive to the 0.9 micron energy emitted by the array 86. The camera 96 may use standard broadcast scan rates, or special scan rates, to produce a video signal represented at output 102, which may then be used to operate a conventional television receiver tube 104. The system 50 thus converts an image in the invisible 8–14 micron region to a visible image that would otherwise be seen by the eye when viewing the runway through an aperture defining the same aspect ratio.

The system 50 embodies a relatively small number of components which are relatively lightweight and which can be housed in the compact unit shown in FIG. 8 where corresponding components are designated by corresponding reference characters. The stationary lens 58 forms the viewing window for a pressurized spherical housing 110. The spherical housing is typically mounted so that it can be pivoted about both the pitch and yaw axis of an aircraft to facilitate aiming the optical axis 112 at the desired target. The search lens system 64 is shown in the active position in FIG. 8, and the tracking lens system 62 in the inactive position. The optical axis 112 is disposed at an angle to the axis of rotation of the mirrors 72a–72d in order to reduce the size of the lenses. However, the axis of rotation of the mirror assembly 54 intersects the optical axis 112 at the entrance pupil 114 of the lens system so that the object will always be focused onto the linear detector array 56. The mirror assembly 54 is driven by the mechanism indicated generally by the reference numeral 116. The mercury-doped germanium detectors 56 are cooled to cryogenic temperatures by a conventional cooling system indicated generally by the reference numeral 118. The emitter array 86 is mounted on cooling fins 120. The amplifiers 84, mirrors 98a–98d, prism 100 and camera 96 are located as shown. Of course, the visual display 104 is located remote from the housing 110 in the aircraft.

Although a preferred embodiment of the invention has been described in detail, it is to be understood that various changes, substitutions and alterations can be made therein without departing from the spirit and scope of the invention as defined by the appended claims.

What I claim is:

1. The method for landing an aircraft on a standard runway under low-ceiling and low-visibility conditions which comprises:
   1. navigating the aircraft to a point on an approach path to the runway,
   2. converting the natural infrared radiation in approximately the 8 to 14 micron range from the runway and surrounding terrain to a visible image by:
      a. scanning said infrared radiation image from the runway and surrounding terrain with a moving mirror means,
      b. detecting said infrared radiation image from the moving mirror means using a detector means thereby producing an output signal proportional in intensity to the infrared radiation,
      c. amplifying said output signal with at least one amplifier channel coupled to said detector means, producing a visible light image using a light emitter means responsive to said amplifier output signal, displaying said visible image to the pilot in said aircraft and
   3. continuing the approach by visually monitoring the display of said visible image of the runway and adjacent terrain and then continuing the approach by visually monitoring a visible image of the runway and adjacent terrain produced from the infrared radiation in approximately the 8 to 14 micron range from the runway and adjacent terrain.

2. The method for landing an aircraft as defined in claim 1 wherein the aircraft is navigated along a predetermined approach path defined by radio beacons broadcast from the ground and received and processed by onboard equipment.

3. The method for landing an aircraft as defined in claim 1 wherein the aircraft is landed manually by reference to the visible image.

4. The method for landing an aircraft as defined in claim 1 wherein the aircraft is landed automatically while the automatic landing is monitored by the pilot by visual reference to the visible image.

5. In a system for landing an aircraft on a standard runway, the combination of:
   an aircraft;
   means carried by said aircraft for navigating the aircraft to a point on the approach path to the runway,
   means for converting the natural infrared radiation in approximately the 8 to 14 micron range from the runway and surrounding terrain to a visible image displayed to the pilot in the aircraft for continuing the approach to said runway,
   wherein said means for converting comprises:
      moving mirror means for scanning said infrared radiation from the runway surrounding terrain,
      detector means for detecting said infrared radiation of the image reflected from said moving mirror means,
      at least one amplifier channel coupled with said detector means for producing an output signal proportional in intensity to the infrared radiation striking said detector means,
      and means responsive to said output signal for producing a visible light image.

6. In a system for landing an aircraft on a standard runway, the combination of:
   an aircraft,
   means carried by said aircraft for navigating the aircraft to a point on the approach path to the runway,
   means for converting the natural infrared radiation in approximately the 8 to 14 micron range from the runway and surrounding terrain to a visible image displayed to the pilot in the aircraft or continuing the approach to said runway, wherein said means for converting comprises:
      moving mirror means for scanning said infrared radiation from the runway and surrounding terrain,
      detector means for detecting said infrared radiation of the image reflected from said moving mirror means,
      at least one amplifier channel coupled with said detector means for producing an output signal proportional in intensity to the infrared radiation striking said detector means,
      and means responsive to said output signal for producing a visible light image.

7. The system of claim 5 wherein
   said moving mirror means comprising first and second sets of mirrors, the mirrors of the first set being mounted for rotation in a first cone of rotation and the mirrors of the second set being mounted for rotation in a second cone of rotation and mechanically coupled to the mirrors of the first set to synchronize rotation of the sets,
   said detector means comprises a plurality of light detectors arrayed generally along the axis of the first cone of rotation for detecting light of an image reflected from the mirrors of the first set as the mirrors are rotated,
   said means for producing an output signal comprises a plurality of light emitters arrayed generally along the axis of the second cone of rotation, the emitters corresponding in number and position to the light detectors, and
   said at least one amplifier channel comprises an amplifier channel interconnecting each detector and the corresponding emitter for causing the emitter to emit light proportional in intensity to the light striking the corresponding detector and reconstitute the image.

8. The system of claim 5 further characterized by:
   means for converting the visible light image to video signal, and
   a video display device located within the sight of the pilot for reproducing the video signal as an image.